United States Patent Office 2,849,443
Patented Aug. 26, 1958

2,849,443

PRODUCTION OF ORGANIC ACID ESTERS OF CELLULOSE

Henry W. Steinmann, Madison, and Michael Dunay, Fanwood, N. J., assignors to Celanese Corporation of America, New York, N. Y., a corporation of Delaware No Drawing. Application March 3, 1955
Serial No. 492,046

9 Claims. (Cl. 260—230)

This invention relates to the production of organic acid esters of cellulose and relates more particularly to an improved process for the production of organic acid esters of cellulose by the homogeneous or solution process.

An important object of this invention is to provide an improved process for the production of organic acid esters of cellulose by the homogeneous or solution process employing a water-immiscible solvent for the organic acid ester of cellulose, in which process organic acids and other impurities in the esterification solution are removed therefrom by dialysis.

Other objects of this invention will be apparent from the following detailed description and claims.

In H. W. Steinmann, United States application S. No. 443,957, filed July 16, 1954, there is disclosed a process for the production of organic acid esters of cellulose in which cellulose is esterified with an organic acid anhydride in the presence of an esterification catalyst and a water-immiscible solvent for the ester being formed. At the completion of the esterification, there is obtained a solution of the ester in the water-immiscible solvent, which solution contains as impurities quantities of organic acid, the esterification catalyst and the like. After any desired intermediate treatment, the said solution is subjected to a two-phase extraction with an aqueous medium under such conditions that no precipitation of the organic acid ester of cellulose takes place whereby the impurities are removed therefrom. The extracted solution may then be dried. Through the use of this process there is obtained a solution of the organic acid ester of cellulose which may be used directly for the spinning of filamentary materials, the casting of film and similar purposes without any intermediate precipitation of the organic acid ester of cellulose as has been the practice in prior processes.

According to the present invention, it has been found that the removal from the esterification solution of impurities such as organic acids, the esterification catalyst and the like may be carried out in an effective and highly economical manner by subjecting the said solution to dialysis. In this way, the impurities may be removed from the esterification solution without bringing the said solution into actual contact with the extracting liquid. As a result, the equipment needed to carry out the extraction may be simplified in construction and operation. In addition, no limits are imposed on the quantity of extracting liquid that may be employed since there is no danger under these conditions that the cellulose ester will precipitate.

Prior to carrying out the esterification the cellulose may advantageously be pretreated, according to the usual practice in the art, to increase its reactivity and thereby shorten the esterification time. Such pretreatment may be effected by adding to the cellulose small quantities of a lower aliphatic acid such as, for example, formic acid, acetic acid, propionic acid or butyric acid, as well as mixtures thereof. There may also be added to the cellulose during the pretreatment all or a portion of the esterification catalyst. The pretreatment of the cellulose may be carried out in a single stage, or in a plurality of stages, all as well known in the art.

The pretreated cellulose is then esterified with an organic acid anhydride corresponding to the organic acid ester of cellulose being formed in the presence of a water-immiscible solvent for the said ester. Suitable water-immiscible solvents for this purpose include, for example, nitromethane, m-cresol, cyclopentanone, pyrrole and furfural. Chlorinated hydrocarbon solvents such as methylene chloride, tetrachloroethane, trichloroethane, trichloroethanol and chloroform may also be employed for this purpose. Extremely valuable results are obtained when methylene chloride is employed as the solvent since it yields solutions that are especially well suited for spinning. Instead of employing a single material as the solvent, a mixture of materials, such as those specified above, may be used for this purpose. The quantity of solvent may range from the minimum necessary to dissolve the organic acid ester of cellulose being formed to any desired maximum. The use of excessively large quantities of solvent is, however, economically undesirable since it involves an added expense in recovering the solvent. When methylene chloride is employed as the solvent, good results have been obtained with from about 700 to 1400 parts by weight of methylene chloride for each 100 parts by weight of cellulose. The quantity of organic acid anhydride is not critical, good results having been obtained with from about 2.4 to 3.2 moles of organic acid anhydride for each 100 parts by weight of cellulose. The quantity of organic acid anhydride specified is in excess of that required to react with any water which may be introduced into the esterification mixture with the cellulose, the pretreating agent, the water-immiscible solvent or from any other source.

The esterification is normally carried out in the presence of an esterification catalyst, which may, for example, be sulfuric acid, perchloric acid, anhydrous ferric chloride, or aromatic and alkyl sulfonic acids. The quantity of such catalyst may range from as little as about 0.5% by weight, or less, to as much as about 5% by weight, or even more, based on the weight of the cellulose, with smaller quantities of catalyst requiring longer reaction times and larger quantities of catalyst requiring shorter reaction times. The esterification reaction is normally carried out at temperature of between about 0 to 50° C.

As the esterification proceeds, the organic acid ester of cellulose being formed will dissolve in the esterification mixture so that at the end of the esterification there will be obtained a substantially homogeneous solution. This solution will contain, in addition to the organic acid ester of cellulose and the water-immiscible solvent therefor, the esterification catalyst, the unreacted organic acid anhydride and a certain proportion of organic acid. The organic acid is derived from a number of sources including the pretreatment acid, the organic acid that is formed by the reaction of the organic acid anhydride with any water that is present in the esterification mixture, the organic acid that is formed by the esterification reaction and any organic acid that is initially present in the organic acid anhydride.

For many purposes, it is desirable to ripen or partially hydrolyze the organic acid ester of cellulose to increase the average number of free hydroxyl groups per anhydroglucose unit in the cellulose molecule. Such ripening may be readily carried out by adding sufficient water to the solution to convert any remaining organic acid anhydride to the corresponding acid, together with an excess of water which may range from about 50 to 100 parts by weight for each 100 parts by weight of cellulose. Following the addition of the water, the solution is held, preferably with agitation, until the desired degree of hydrolysis has taken place. The temperature of the solution may be raised to increase the speed of the ripening process. It may also be desirable in some cases to add a quantity of a mineral acid to the solution to accelerate the ripening, or it may be desirable to neutralize all or a portion of the acid esterification catalyst, where one is used, to slow down the ripening. The addition of further quantities of mineral acid to the ripening solution or the neutralization of all or a portion of the acid catalyst therein may be effected at the beginning of the ripening process or after the ripening has proceeded to some extent.

Whether or not the organic acid ester of cellulose is ripened, it is desirable to neutralize the acid esterification catalyst, such as perchloric acid, before subjecting the esterification solution to dialysis. It is preferred to carry out the neutralization of the said catalyst with a nitrogenous base that will react therewith to form an ammonium perchlorate. Suitable nitrogenous bases that may be used for this purpose are ammonia and amines, including aliphatic and aromatic primary, secondary and tertiary amines as well as amines in which the nitrogen atom forms a part of a heterocyclic ring. Examples of such nitrogenous bases are ammonia, diethylamine, piperidine, quinoline, pyridine, triethylamine, aniline, ethylamine, trimethylamine and dimethylamine. The nitrogenous bases are soluble in the esterification solution and react with the perchloric acid present therein to give ammonium perchlorates which may be substituted or not. It has been found that these ammonium perchlorates are extracted more readily from the esterification solution than is the acid esterification catalyst itself or salts of said catalyst with inorganic alkaline materials. The quantity of nitrogenous base that is employed should be at least sufficient to neutralize all of the perchloric acid, quantities providing a 10 to 50% molar excess of the nitrogenous base as compared with the perchloric acid, being preferred.

The esterification solution is then entered into a dialysis cell where it is brought into contact with one side of a membrane which may be a permeable or a semi-permeable membrane along the other side of which there is passed a stream of extracting liquid. The acids, salts and other impurities in the esterification solution pass through the membrane into the extracting liquid and are carried away thereby. When all the impurities have been removed therefrom, the esterification solution, after drying when necessary, adjustment in concentration and addition thereto of other substances, when desired, is ready for use.

The membranes that may be employed in carrying out the dialysis include, for example, permeable materials such as filter paper and porous ceramics. These materials are suitable where the extracting liquid is an aqueous medium since the said medium will itself prevent the passage of the organic acid ester of cellulose through the membrane. It is preferred to employ as the membrane a semi-permeable material through which the organic acid ester of cellulose and the solvent in which the ester is dissolved will not pass. Examples of such materials are cellophane (coated or uncoated), parchment paper (animal or vegetable), and Saran (vinylidene chloride polymer). The extracting liquid is preferably water or other aqueous medium such as a mixture of water and a water-miscible solvent, for example, methanol, ethanol, propanols, ethyl acetate, pyridine, acetone and methyl acetone. It is also possible to employ as the extracting liquid non-aqueous media, for example, the materials listed above as water-immiscible solvents for the organic acid ester of cellulose. When a non-aqueous medium is employed as the extracting liquid, the rate of extraction is reduced. However there are a number of compensating advantages, as will be set out more fully below. While the dialysis may be carried out on a batch basis, it is preferred for commercial operations in the interests of economy to carry out the dialysis in a continuous manner. For example, the esterification solution and the extracting liquid may be flowed continuously through a dialysis cell or group of cells, advantageously in a countercurrent manner whereby the fresh incoming liquid will act on the almost completely purified esterification solution, etc. Through the use of countercurrent flow, it is possible to improve the efficiency with which the extracting liquid is employed and also to increase the final concentration of the acid therein whereby the recovery of such acid is materially simplified. The esterification solution, the extracting liquid, or both may be stirred to insure an efficient contact of said materials with the membranes.

When an aqueous medium is employed as the extracting liquid, the water in the said medium will pass by osmosis through the membrane into the esterification solution. While the quantity of water that will enter the esterification solution in this manner is small and will not cause the precipitation of the organic acid ester of cellulose, it will impart to the said solution a cloudy appearance, which cloudiness is probably due to the formation of an emulsion. However, since there is no separation of the organic acid ester of cellulose from the emulsion, it will hereinafter be referred to as a solution. The presence of this water in the dialyzed solution impairs the spinning properties of the said solution so that removal of the water therefrom is desirable. Such removal may be readily effected through the use of drying agents or by distillation. It is possible to minimize the passage of water through the membrane by applying to the esterification solution a pressure at least equal to the osmotic pressure. The passage of water through the membrane may also be materially reduced by applying to the esterification solution a pressure less than the osmotic pressure. When a non-aqueous medium is employed as the extracting liquid, there are no problems created by any osmosis that may occur.

At the end of the dialysis, there is obtained a solution of the organic acid ester of cellulose in the water-immiscible solvent which is free from impurities, but which may contain water. After drying the said solution, if necessary, it will usually be desirable to remove from the said solution a portion of the water-immiscible solvent to increase the concentration of the solution so that it will be better suited for spinning operations. In some cases, it may, on the other hand, be preferred to add a further quantity of solvent to the solution to reduce the concentration of the organic acid ester of celulose therein. The spinning properties of the solution may also be improved by adding thereto a proportion of a second and different solvent. For example, when methylene chloride is the water-immiscible solvent, the spinning properties of the solution may be improved by adding thereto a lower aliphatic alcohol such as methanol, ethanol, normal propanol or isopropanol. There may also be added to the solution pigments, dyes, plasticizers, fire-retardants and other materials capable of altering the appearance or properties of the final products.

It may also be desirable to treat the solution with a decolorizing agent such as activated charcoal, diatomaceous earth or fuller's earth to remove therefrom color-producing materials. The solution may also be filtered to remove particles therefrom such as bits of unacetylated cellulose, dirt and the like.

The solution of organic acid ester of cellulose obtained in this manner is well suited for spinning by conventional spinning techniques to form filaments, films and the like as well as for coatings and similar purposes. It is free from impurities that would interfere with the spinning operation or impair the properties of the products produced therefrom. Because no precipitation steps are involved in preparing the solutions, important economies can be achieved in such preparation. The organic acid ester of cellulose may, if desired, also be precipitated from such solution by mixing the same with a large excess of a non-solvent for the organic acid ester of cellulose, in which case there will be obtained a product which needs no further purification to prepare it for use.

The process of this invention is generally suited for the production of organic acid esters of cellulose, regardless of their degree of substitution. It is especially well suited for the production of organic acid esters of cellulose with complete esterification to give triesters or cellulose esters of varying degree of esterification having fewer than 0.6 free hydroxyl groups per anhydroglucose unit in the cellulose molecule since it avoids the difficulties that are normally encountered in preparing such esters by the solution process.

The invention will now be described specifically in connection with the production of cellulose acetate which is commercially the most important organic acid ester of cellulose at the present time. However, it may also be employed for the production of other organic acid esters of cellulose including cellulose propionate, cellulose butyrate, cellulose acetate formate, cellulose acetate propionate, cellulose acetate butyrate and cellulose benzoate.

The following example is given to illustrate this invention further.

*Example*

Wood pulp cellulose is pretreated with acetic acid and is then esterified with acetic anhydride in the presence of perchloric acid as an esterification catalyst and methylene chloride as a solvent, in a manner well known in the art. The esterification solution, which contains 8 to 9% of cellulose triacetate and 12% of acetic acid is entered into a dialysis apparatus equipped with parchment paper membranes and through which a stream of water flows countercurrent to the esterification solution. The rate of flow is adjusted so that the esterification solution remains in the dialysis apparatus 48 hours. On leaving the dialysis apparatus, the esterification solution is substantially free from acetic acid and other impurities, but contains 2.6% by weight of water. The water is removed therefrom by distillation and sufficient methylene chloride is also distilled therefrom to raise the cellulose acetate concentration to 20 to 25%. The solution is then filtered and spun into filamentary materials having good commercial properties.

It is to be understood that the foregoing detailed description is merely given by way of illustration and that many variations may be made therein without departing from the spirit of our invention.

Having described our invention, what we desire to secure by Letters Patent is:

1. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, passing the said solution over one surface of a membrane, and passing an extracting liquid over the other surface of the membrane whereby impurities in the solution will pass through the membrane by dialysis and be carried away by the extracting liquid.

2. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, passing the said solution over one surface of a membrane, and passing an aqueous extracting liquid over the other surface of the membrane whereby impurities in the solution will pass through the membrane by dialysis and be carried away by the extracting liquid.

3. In a process for the production of organic acid esters of cellulose, the steps which comprise esterifying cellulose with an organic acid anhydride in the presence of an esterification catalyst and a water-immiscible solvent for the ester being formed whereby there will be obtained at the completion of the esterification a substantially homogeneous solution, passing the said solution over one surface of a membrane, and passing an aqueous extracting liquid over the other surface of the membrane whereby impurities in the solution will pass through the membrane by dialysis and be carried away by the extracting liquid.

4. In a process for the production of organic acid esters of cellulose, the steps which comprise esterifying cellulose with an organic acid anhydride in the presence of a water-immiscible solvent for the ester being formed whereby there will be obtained at the completion of the esterification a substantially homogeneous solution, passing the said solution over one surface of a membrane, passing an aqueous extracting liquid over the other surface of the membrane whereby impurities in the solution will pass through the membrane by dialysis and be carried away by the extracting liquid, and removing at least a portion of the water present in the extracted solution.

5. In a process for the production of organic acid esters of cellulose, the steps which comprise esterifying cellulose with an organic acid anhydride in the presence of methylene chloride whereby there will be obtained at the completion of the esterification a substantially homogeneous solution, passing the said solution over one surface of a membrane, and passing an extracting liquid over the other surface of the membrane whereby impurities in the solution will pass through the membrane by dialysis and be carried away by the extracting liquid.

6. In a process for the production of organic acid esters of cellulose, the steps which comprise esterifying cellulose with an organic acid anhydride in the presence of methylene chloride whereby there will be obtained at the completion of the esterification a substantially homogeneous solution, passing the said solution over one surface of a membrane, and passing an aqueous extracting liquid over the other surface of the membrane whereby impurities in the solution will pass through the membrane by dialysis and be carried away by the extracting liquid.

7. In a process for the production of cellulose acetate, the steps which comprise esterifying cellulose with acetic anhydride in the presence of a water-immiscible solvent for the ester being formed whereby there will be obtained at the completion of the esterification a substantially homogeneous solution, passing the said solution over one surface of a membrane, and passing an extracting liquid over the other surface of the membrane whereby impurities in the solution will pass through the membrane by dialysis and be carried away by the extracting liquid.

8. In a process for the production of cellulose acetate, the steps which comprise esterifying cellulose with acetic anhydride in the presence of methylene chloride whereby there will be obtained at the completion of the esterification a substantially homogeneous solution, passing the said solution over one surface of a semi-permeable membrane, and passing an extracting liquid over the other surface of the semi-permeable membrane whereby impurities in the solution will pass through the membrane by dialysis and be carried away by the extracting liquid.

9. In a process for the production of cellulose acetate, the steps which comprise esterifying cellulose with acetic anhydride in the presence of methylene chloride whereby there will be obtained at the completion of the esterification a substantially homogeneous solution, passing the said solution over one surface of a semi-permeable membrane, passing an aqueous extracting liquid over the other surface of the semi-permeable membrane whereby impurities in the solution will pass through the membrane by dialysis and be carried away by the extracting liquid, and removing at least a portion of the water present in the extracted solution.

References Cited in the file of this patent

UNITED STATES PATENTS

| | | |
|---|---|---|
| 1,815,761 | Cerini | July 21, 1931 |
| 1,885,393 | Van Schaack | Nov. 1, 1932 |
| 2,126,190 | Hofmann | Aug. 9, 1938 |

FOREIGN PATENTS

| | | |
|---|---|---|
| 696,903 | Great Britain | Sept. 9, 1953 |